United States Patent
Miyazaki

(10) Patent No.: US 7,875,669 B2
(45) Date of Patent: Jan. 25, 2011

(54) PRODUCTION PROCESS OF RUBBER COMPOSITION AND RUBBER COMPOSITION USING THE PROCESS, AND TIRE USING THE RUBBER COMPOSITION

(75) Inventor: Tatsuya Miyazaki, Kobe (JP)

(73) Assignee: Sumitomo Rubber Industries, Ltd., Kobe-shi, Hyogo-ken (JP)

( * ) Notice: Subject to any disclaimer, the term of this patent is extended or adjusted under 35 U.S.C. 154(b) by 0 days.

(21) Appl. No.: 12/500,294

(22) Filed: Jul. 9, 2009

(65) Prior Publication Data
US 2010/0041815 A1 Feb. 18, 2010

(30) Foreign Application Priority Data
Aug. 12, 2008 (JP) ............................. 2008-208137

(51) Int. Cl.
*C08K 3/34* (2006.01)
(52) U.S. Cl. .................. 524/449; 524/493; 524/502; 525/236; 525/511
(58) Field of Classification Search ................ 525/236, 525/511; 524/449, 493, 502
See application file for complete search history.

(56) References Cited

U.S. PATENT DOCUMENTS 7,414,094 B2 * 8/2008 Miyazaki .................... 525/237

FOREIGN PATENT DOCUMENTS

JP 2006-328193 A 12/2006

* cited by examiner

*Primary Examiner*—Ling-Siu Choi
(74) *Attorney, Agent, or Firm*—Birch, Stewart, Kolasch & Birch, LLP

(57) ABSTRACT

A production process of a rubber composition superior in low rolling resistance, air permeation resistance and durability performance is provided, the production process comprising the following (X), (Y) and (F): (1) step (X) of kneading a rubber component (A) including a butyl rubber and filler for reinforcement, (2) step (Y) of then adding a rubber component (B) and mica to the kneaded article obtained by step (X) and kneading it, and (3) step (F) of then further adding sulfur, a vulcanization accelerator and a vulcanization accelerating aid to the kneaded article obtained by step (Y) and kneading it, wherein 10 to 50 parts by mass of mica and/or talc is included based on 100 parts by mass of the whole rubber components (C).

5 Claims, No Drawings

PRODUCTION PROCESS OF RUBBER COMPOSITION AND RUBBER COMPOSITION USING THE PROCESS, AND TIRE USING THE RUBBER COMPOSITION

BACKGROUND OF THE INVENTION

The present invention relates to a production process of a rubber composition and the rubber composition obtained by the process, and a tire using the rubber composition.

Mica used as filler in a rubber composition for tire is flat, superior in air-blocking property and shape-retaining property during process and preferable for use as the inner liner member of a tire.

If the air-blocking property of a rubber composition is improved, the butyl rubber amount in rubber components included in the rubber composition can be reduced (namely, a natural rubber (NR), an epoxidized natural rubber (ENR) or a butadiene rubber (BR) can be partially used as a rubber component), and LRR (low rolling resistance=low tan δ) is enabled because the heat build-up property of the whole rubber matrix is improved.

If mica is compounded as filler in a rubber composition for tire, rubber polymer component can be reduced, the compounding amounts of carbon black and silica can be reduced, and when the proportion of rubber polymer component is large in the rubber composition, the production cost of the rubber composition for tire is heightened, and the flatness of vulcanized rubber sheet, shrinkage after extrusion, sharp edge property and tensile property at high temperature tend to be lowered.

The total compounding amount of filler including mica in the rubber composition for tire has been conventionally preferably 45 to 70 parts by mass based on 100 parts by mass of the rubber components. Further, the compounding amount of mica in filler is preferably 15 to 45 parts by mass.

However, problems have been also generated by compounding mica as filler in the rubber composition for tire.

Mica has usually particle size of 25 to 100 μm. When the hardness of rubber compounding article produced is great, mica becomes easily destruction nuclei when filler dispersion is bad; therefore since crack growth property is accelerated, result not preferable for the rubber composition for tire is generated. As deduced from the fact that mica does not affect the viscosity of the rubber compounding article, it does not generate kneading shear (torque at mixing) and as a result, it causes the rotor slip (bad kneading) of Banbury mixer. In particular, when ENR having low rubber polymer viscosity and chlorobutyl HT 1066 with low viscosity are used, the dispersion of filler is bad and crack growth is also bad (namely, crack growth property is accelerated) because of the influence of low filler. For example, air permeability, moisture permeability and LRR can be expected to be enhanced in good balance by a rubber compounding system in which NR used in combination with butyl rubber as the rubber component used in the rubber composition for tire is exchanged with ENR, and ENR 25 and the butyl rubber are mixed at a mass ratio of 45:55. However, although ENR is wanted to be used, crack growth is bad because the viscosity of ENR is lower than that of NR as raw material, the viscosity of compounding is lowered entirely and filler is hardly separated; therefore it cannot be adopted.

Various procedures are presented for improving these problems. Various procedures and problems thereof are described below.

(1) The portion of butyl rubber and NR is replaced with BR. However, the air leak of a tire tends to increase. The order that air retention property is good is butyl rubber≈ENR 50>>ENR 25>NR>BR.

(2) Mica is not used in the rubber composition for tire as filler but flat clay with smaller particle diameter is used. However, the air leak of a tire tends to increase.

(3) ENR with high viscosity is prepared to be used as a rubber component. However, since a step of epoxidizing a natural rubber (TSR) is required, higher viscosity than TSR is substantially impossible. Accordingly, essential improvement is not attained.

(4) The compounding amount of filler compounded in the rubber composition for tire, for example, the compounding amount of silica is increased. This increases shear and improve dispersion, but it tends to run contrary to LRR (low rolling resistance=low tan δ).

(5) The crosslinking density of rubber included in the rubber composition for tire is reduced. In order to do so, there is a method of reducing the compounding amounts of sulfur used as a vulcanizing agent and a vulcanization accelerator and not using a vulcanization accelerating aid including sulfur (for example, TACKIROL V200 (alkylphenol-sulfur chloride condensate) available from Taoka Chemical Co., Ltd.). However, tan δ tends to be deteriorated (namely, LRR (low rolling resistance=low tan δ) is not attained).

For example, in patent literature 1, there is disclosed a rubber composition for inner liner including 10 to 50 parts by weight of mica having an aspect ratio of at least 50 and average particle diameter of 40 to 100 μm, based on 100 parts by weight of rubber components comprising 30 to 60% by mass of a butyl rubber, 20 to 50% by mass of a natural rubber or an isoprene rubber and 10 to 40% by mass of a butadiene rubber, in order to provide a rubber composition for inner liner that improves the air retention property of a tire, lowers hysteresis loss and further prevents crack growth. However, there is room for improvement that mica is prepared as a lubricant during kneading a rubber and inhibits the dispersion of polymer and carbon/silica, tan δ is low and elongation at break is low (wherein, because of including BR, crack property is improved).

[Patent literature 1] Japanese Unexamined Patent Publication No. 2006-328193

SUMMARY OF THE INVENTION

It is the purpose of the present invention to provide a production process of a rubber composition superior in LRR (low rolling resistance=low tan δ), air permeation resistance and durability performance.

The present invention relates to a production process of a rubber composition comprising of the following (X), (Y) and (F);

(1) step (X) of kneading a rubber component (A) comprising a butyl rubber and 5 to 50 parts by mass of at least one filler for reinforcement selected from a group comprising mica, silica and carbon black based on 100 parts by mass of whole rubber components (C), the proportion of the rubber component (A) occupying the whole rubber components (C) being 10 to 90% by mass, (2) step (Y) of adding a rubber component (B) and further 5 to 50 parts by mass of mica based on 100 parts by mass of the whole rubber components (C) to the kneaded article obtained by step (X) and kneading it, the proportion of the rubber component (B) occupying the whole rubber components (C) being 10 to 90% by mass, and (3) step (F) of adding sulfur, a vulcanization accelerator and a vulcanization accelerating aid based on 100 parts by mass of the whole rubber components C) to the kneaded article obtained by step (Y) and kneading it, wherein 10 to 50 parts by mass of mica and/or talc is comprised based on 100 parts by mass of the whole rubber components (C) comprising 30 to 100% by mass of butyl rubber.

It is preferable to add 20 to 60 parts by mass of carbon black and/or silica based on 100 parts by mass of the whole rubber components (C) comprising 30 to 100% by mass of butyl rubber, in step (X) of the production process of a rubber composition.

It is preferable to add 10 to 70 parts by mass of epoxidized natural rubber (ENR) based on 100 parts by mass of the whole rubber components (C) comprising 30 to 90% by mass of butyl rubber, in step (Y) of the production process of a rubber composition.

The present invention relates to the rubber composition obtained by the production process.

The present invention relates to a tire using the rubber composition obtained by the production process, for inner liner.

DETAILED DESCRIPTION

The technical improvement point of the production process of the rubber composition of the present invention is described.

(A) The production process of the rubber composition of the present invention includes a kneading step having at least 3 steps (steps (X), (Y) and (F) described below), the compounding amount of a rubber polymer component is reduced at kneading in first step (X) and residual rubber polymer is charged at the kneading of next step (Y). Further, butyl rubber that is hardly mixed with silica and carbon black compounded as filler is charged in first step (X). The proportion of the filler occupying the rubber polymer is heightened in first step (X) and the dispersion of the filler in the rubber component is improved.

(B) Mica as the filler is charged in step (Y). As a result, rotary slip by mica is reduced in step (X) being the previous step of step (Y) and the dispersion of the filler in the rubber component is improved.

The dispersion of the filler in first step (X) is improved by adopting (A) and (B) and as a result, there can be obtained the rubber composition by which E* (complex elastic modulus) is lowered, tan δ is lowered (the improvement of rolling resistance), EB (elongation at break) is improved and crack growth is improved.

The production process of the rubber composition of the present invention is preferable for a production process of compounding at least 40% by mass of butyl rubber in a rubber component and the production process of a rubber composition used for the inner liner of a tire, in particular. Even if a number of kneading steps is increased for a compounding of at least 40% by mass of butyl rubber in a rubber component, final compounding viscosity changes extremely little. It can be considered as its reason that oxygen in air is taken in by kneading and the cutting of double bonds is generated. Butyl rubber traps radical generated and the cutting of rubber polymer is not generated. It can be also considered as its reason that, in a compounding of at least 40% by mass of butyl rubber in a rubber component, there is not enough oxygen in a rubber component to surround other rubber except butyl rubber since butylenes, which are main components of butyl rubber, are originally superior in air retention property. Although filler dispersibility is improved by increase of the number of the kneading steps in case of rubber compounding rich in NR, the cutting of polymer is generated by radicals generated at kneading, tan δ tends to be increased and EB tends to be lowered. Comprehensively, there is also event negating the effect of the kneading cycle increase and the improvement of kneading process.

When mica is charged in step (Y), it causes rotor stop simultaneously. Oil and resin are preferably charged in step (Y). Mica and oils are often causal factors for slip in step (Y) and the improvement of filler dispersion is not expected only in step (Y), but step (X) has great role of the improvement in place of step (Y).

The difficulty of dispersion in the rubber component is generally in the order of zinc oxide powder (zinc oxide) <carbon black<silica<rubber polymer. The polymer is sticky and can be mixed in step (F). Zinc oxide powder is mineral and most hardly mixed. Although silica is mineral in nature, treatment of enlarging BET specific area is carried out and its dispersibility is better than that of carbon black. Filler such as talc other than mica that does not affect compounding viscosity (namely, filler not generating kneading torque) is applicable in common.

The production process of the rubber composition of the present invention is described.

The present invention is the production process of a rubber composition comprising of the following (X), (Y) and (F);

(1) step (X) of kneading a rubber component (A) comprising a butyl rubber and 5 to 50 parts by mass of at least one filler for reinforcement selected from a group comprising mica, silica and carbon black based on 100 parts by mass of whole rubber components (C), the proportion of the rubber component (A) occupying the whole rubber components (C) being 10 to 90% by mass, (2) step (Y) of adding a rubber component (B) and further 5 to 50 parts by mass of mica based on 100 parts by mass of the whole rubber components (C) to the kneaded article obtained by step (X) and kneading it, the proportion of the rubber component (B) occupying the whole rubber components (C) being 10 to 90% by mass, and (3) step (F) of adding sulfur, a vulcanization accelerator and a vulcanization accelerating aid based on 100 parts by mass of the whole rubber components (C) to the kneaded article obtained by step (Y) and kneading it, wherein 10 to 50 parts by mass of mica and/or talc is comprised based on 100 parts by mass of the whole rubber components (C) comprising 30 to 100 parts by mass of butyl rubber.

The production process of the rubber composition of the present invention includes step (X). In step (X) of kneading, 5 to 50 parts by mass of at least one filler for reinforcement selected from a group comprising mica, silica and carbon black based on 100 parts by mass of the rubber component (A) including butyl rubber and the whole components (C) is kneaded and the proportion of the rubber component (A) occupying in the whole rubber components (C) is 10 to 90% by mass.

The butyl rubber is included in the rubber component (A) (the rubber component (A) including butyl rubber) included in step (X) of kneading. The butyl rubber used as the rubber component and the rubber component other than the butyl rubber are not specifically limited as long as they are used for a tire. The butyl rubber includes a butyl rubber, halogenated butyl rubbers such as a chlorinated butyl rubber (Cl-IIR), a brominated butyl rubber (Br-IIR), a fluorinated butyl rubber (F-IIR) and an expro butyl. An arbitrary diene rubber can be used as the rubber component other than butyl rubber and there are specifically mentioned a natural rubber (NR), a polyisoprene rubber (IR), various types of polybutadiene rubbers (BR), various types of styrene-butadiene copolymer rubbers (SBR), an acrylonitrile-butadiene copolymer rubber (NBR) and a polychloroprene (CR). These rubber components may be used alone and at least two kinds may be used in combination.

Among these butyl rubbers, a chlorobutyl rubber (Cl-IIR) (for example, Chlorobutyl HT 1068 manufactured by Exxon Mobil) is preferably used because tan δ is low and the viscosity of raw material is high. As the rubber component other than butyl rubber, a natural rubber (NR) is preferably used because processability is good, tan δ is low, fracture strength is good and viscosity is high.

The content rate of the butyl rubber in the rubber component (A) is preferably 40 to 80% by mass and more preferably 50 to 70% by mass in the rubber component (A) including butyl rubber because dispersion can be accelerated by applying shear on filler by X kneading, air permeability resistance and crack growth resistance are kept, the increase of tan δ is suppressed and the heat build-up of inner liner can be suppressed.

In step (X) of kneading, 5 to 50 parts by mass of at least one filler for reinforcement selected from a group comprising mica, silica and carbon black based on 100 parts by mass of whole rubber components (C) are kneaded. Mica, silica and carbon black included in step (X) of kneading are not specifically limited so far as they are used for a tire.

The average particle diameter of mica is preferably 0.1 to 100 μm and more preferably 1 to 70 μm. When the average particle diameter of mica is less than 0.1 μm, aspect ratio is at most 10 and the reduction effect of air permeation quantity tends to be lessened. When the average particle diameter of mica exceeds 100 μm, the durability of inner liner tends to be deteriorated.

The average thickness of mica is preferably 0.005 to 5 μm and more preferably 0.01 to 2 μm. When the average thickness of mica is less than 0.005 μm, the strength of filler itself tends to be lowered and mica tends to be cracked. When the average thickness of mica exceeds 5 μm, aspect ratio tends to be lower than 20 and the reduction effect of air permeation quantity tends to be lessened.

The average aspect ratio of mica is preferably 10 to 1000 and more preferably 20 to 800. When the average aspect ratio of mica is less than 10, the reduction effect of air permeation quantity tends to be lessened. When the average aspect ratio of mica exceeds 1000, the strength of filler is lowered and the filler itself tends to be brittle.

The nitrogen adsorption specific surface area ($N_2SA$) of silica is preferably at least 100 $m^2/g$ and more preferably at least 110 $m^2/g$ because durability (reinforcing property) is superior. The $N_2SA$ of silica is preferably at most 300 $m^2/g$ and more preferably at most 290 $m^2/g$ because it can be prevented that heat build-up is enlarged because of the deterioration of dispersion.

A silane coupling agent is preferably included when silica is used in the present invention. The silane coupling agent capable of being preferably used in the present invention can be an arbitrary silane coupling agent that has been conventionally used with silica in combination. Specifically, there are mentioned sulfides series such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropylmethacrylate monosulfide and 3-trimethoxysilylpropyl methacrylate monosulfide; mercapto series such as 3-mercaptopropyltrimethoxysilane, 3-mercaptopropyltriethoxysilane, 2-mercaptoethyltrimethoxysilane and 2-mercaptoethyltriethoxysilane; vinyl series such as vinyl triethoxysilane and vinyl trimethoxysilane; amino series such as 3-aminopropyltriethoxysilane, 3-aminopropyltrimethoxysilane, 3(2-aminoethyl)aminopropyltriethoxysilane and 3-(2-aminoethyl)aminopropyltrimethoxysilane; glycidoxy series such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro series such as 3-nitropropyltrimethoxysilane and 3-nitropropyltriethoxysilane; chloro series such as 3-chloropropyltrimethoxysilane, 3-chloropropyltriethoxysilane, 2-chloroethyltrimethoxysilane and 2-chloroethyltriethoxysilane. Among them, bis(3-triethoxysilylpropyl)tetrasulilde, bis(3-triethoxysilylpropyl)disulfide and 3-mercaptopropyltrimethoxysilane are preferably used in terms of satisfying both of the addition effect of the coupling agent and cost. These silane coupling agents may be used alone or at least two kinds may be used in combination. The silane coupling agent includes Si69 (bis(3-triethoxysilylpropyl)tetrasulfide), Si75 (bis(3-triethoxysilylpropyl)disulfide,) and Si266, but Si75 is preferably used because effect of improving the dispersibility of silica is obtained and cost is low.

The compounding amount of the silane coupling agent is preferably 1 to 15 parts by mass based on 100 parts by mass of silica and more preferably 4 to 10 parts by mass because coupling effect is obtained by appropriate cost and further better reinforcing property and abrasion resistance can be attained.

Carbon black is not specifically limited, but for example, grades such as SAF, ISAF-HM, ISAF-LM, ISAF-HS, HAF and FEF can be used. N660 to N110 can be used. N660 is preferably used because it is low heat build-up.

The compounding amount of the at least one filler for reinforcement selected from a group comprising mica, silica and carbon black is 5 to 50 parts by mass based on the whole rubber components (C), preferably 10 to 50 parts by mass and more preferably 20 to 45 parts by mass in step (X) of kneading.

The proportion of the rubber component (A) occupying the whole rubber components (C) is 10 to 90% by mass, preferably 30 to 80% by mass and more preferably 40 to 70% by mass in step (X) of kneading because the dispersion of filler is improved and tan δ and EB are improved.

The kneading temperature of step (X) of kneading is preferably 140 to 200° C. and more preferably 150 to 180° C. because the dispersion of filler is improved and tan δ and EB are improved.

The kneading time of step (X) of kneading depends on the type of a Banbury mixer and fill factor.

The production process of the rubber composition of the present invention includes step (Y) of kneading. Step (Y) of kneading is a step by which the rubber component (B) and 5 to 50 parts by mass of mica based on 100 parts by mass of the whole rubber components (C) are further added to the kneaded articles obtained in step (X) and kneaded. The proportion of the rubber component (B) occupying the whole rubber components (C) is 10 to 90% by mass.

Those used for tire are not specifically limited as the rubber component (B) included in step (X) of kneading. The butyl rubber includes a butyl rubber, halogenated butyl rubbers such as a chlorinated butyl rubber (Cl-IIR), a brominated butyl rubber (Br-IIR), a flourinated butyl rubber (F-IIR) and an expro butyl. An arbitrary diene rubber can be used as the rubber component other than the butyl rubber and there are specifically mentioned a natural rubber (NR), a polyisoprene rubber (IR), various types of polybutadiene rubbers (BR), various types of styrene-butadiene copolymer rubbers (SBR), an acrylonitrile-butadiene copolymer rubber (NBR) and a polychloroprene (CR). These rubber components may be used alone and at least two kinds may be used in combination.

As the rubber component other than the butyl rubber, a natural rubber (NR) is preferably used because processability is good, tan δ is low, fracture strength is good and viscosity is high.

When the butyl rubber is used, a chlorobutyl rubber (Cl-IIR) (for example, Chlorobutyl HT 1068 available from Exxon Mobile) is preferably used because processability, tan δ and fracture strength are good and the viscosity is high.

In step (Y) of kneading, 5 to 50 parts by mass of mica based on 100 parts by mass of whole rubber components (C) is further added and kneaded.

Mica included in step (Y) of kneading is not specifically limited as long as it is used for a tire.

The average particle diameter of mica is preferably 0.1 to 100 μm and more preferably 1 to 70 μm. When the average particle diameter of mica is less than 0.1 μm, aspect ratio tends to be lower than 10 and the reduction effect of air permeation quantity tends to be lessened. When the average particle diameter of mica exceeds 100 μm, the durability of inner liner tends to be deteriorated.

The average thickness of mica is preferably 0.005 to 5 μm and more preferably 0.01 to 2 μm. When the average thickness of mica is less than 0.005 μm, the strength of filler itself is lowered and mica tends to be cracked. When the average thickness of mica exceeds 5 μm, aspect ratio tends to be lower than 20 and the reduction effect of air permeation quantity tends to be lessened.

The average aspect ratio of mica is preferably 10 to 1000 and more preferably 20 to 800. When the average aspect ratio of mica is less than 10, the reduction effect of air permeation quantity tends to be lessened. When the average aspect ratio of mica exceeds 1000, the strength of filler tends to be lowered and the filler itself tends to be brittle.

The compounding amount of mica is 5 to 50 parts by mass based on the whole rubber components (C), preferably 10 to 45 parts by mass and more preferably 15 to 40 parts by mass in step (Y) of kneading because air permeability resistance is improved and elongation at break and crack growth are not sacrificed.

The proportion of the rubber component (B) occupying the whole rubber components (C) is 10 to 90% by mass, preferably 15 to 70% by mass and more preferably 20 to 60% by mass in step (Y) of kneading.

The kneading temperature of step (Y) of kneading is preferably 140 to 200° C. and more preferably 150 to 180° C. because the dispersion of filler is improved and tan δ and EB are improved.

In the production process of the rubber composition of the present invention, the whole rubber components (C) is the sum of the rubber component (A) in step (X) and the rubber component (B) in step (Y).

The production process of the rubber composition of the present invention includes step (F) of kneading. In step (F) of kneading, sulfur, a vulcanization accelerator, zinc oxide powder and a vulcanization accelerating aid based on 100 parts by mass of the whole rubber components (C) are added to the kneaded articles obtained by step (Y) and kneaded.

The kneading temperature of step (F) of kneading is preferably 80 to 120° C. and more preferably 85 to 110° C. because rubber scorch is prevented and the dispersion of chemicals is secured.

In the rubber composition obtained in the production process of the rubber composition of the present invention, 10 to 50 parts by mass of mica and/or talc are included based on 100 parts by mass of the whole rubber components (C) including 30 to 100% by mass of the butyl rubber.

The content of the butyl rubber in the rubber component is 30 to 100% by mass, preferably 35 to 80% by mass and more preferably 40 to 70% by mass in the whole rubber components (C) because air permeability resistance and crack growth resistance are kept, the increase of tan δ is suppressed and the heat build-up of inner liner can be suppressed.

Mica and/or talc are included in the rubber composition obtained by the production process of the rubber composition of the present invention because air permeability resistance is bettered and the rubber component is relatively reduced. Mica and talc are not specifically limited so far as they are those conventionally used in the rubber composition for tire, and these filler for reinforcement may be used alone and two kinds may be used in combination.

The rubber composition obtained bay the production process of the rubber composition of the present invention includes 10 to 50 parts by mass of mica and/or talc based on 100 parts by mass of the rubber components (C), preferably 15 to 45 parts by mass and more preferably 20 to 40 parts by mass.

In the production process of the rubber composition of the present invention, 20 to 60 parts by mass of carbon black and/or silica based on 100 parts by mass of the whole rubber components (C) including 30 to 100% by mass of the butyl rubber is preferably added in step (X) because fracture strength, Hs and crack growth are secured.

As carbon black and silica used, those described above can be used.

When silica is used, a silane coupling agent is preferably included. The silane coupling agent capable of being preferably used in the present invention is an arbitrary silane coupling agent conventionally used in combination with silica. As the silane coupling agent, those described above can be used. When the compounding amount of silica is at most 12 parts by mass, the silane coupling agent may not be used because the dispersion of silica is good and silica is not aggregated.

In the production process of the rubber composition of the present invention, 10 to 70 parts by mass of an epoxidized natural rubber (ENR) based on 100 parts by mass of the whole rubber components (C) including 30 to 90% by mass of the butyl rubber is preferably added in step (Y).

In the production process of the rubber composition of the present invention, 10 to 70 parts by mass of an epoxidized natural rubber (ENR) based on 100 parts by mass of the whole rubber components (C) including 30 to 90% by mass of the butyl rubber is preferably added in step (Y), 20 to 60 parts by mass of ENR is more preferably added and 30 to 50 parts by mass of ENR is more preferably added because it is inferior in air permeability resistance to the butyl rubber (BR) but it is superior in that to the natural rubber (NR).

The present invention also relates to the rubber composition obtained by the production process of the rubber composition of the present invention.

The rubber composition obtained by the production process of the present invention is preferably used as inner liner in a tire because of LRR and high durability.

The tire of the present invention is produced by a usual method using the rubber composition produced by the production process of the present invention. Namely, the rubber composition produced by the production process of the present invention is extruded and processed in matching with the shape of the respective members of a tire, preferably inner liner at unvulcanization stage and molded on a tire molding machine by a usual method; thereby unvulcanized tire is formed. The unvulcanized tire is heated and pressurized in a vulcanizer to obtain the tire of the present invention.

EXAMPLE

The present invention is specifically described based on Examples, but the present invention is not limited only thereto.

Then, various types of chemicals used in Examples and Comparative Examples are described.

Butyl HT 1068: Chlorobutyl rubber (Cl-IIR), Chlorobutyl HT 1068 available from Exxon Mobil.

Natural rubber (NR): TSR20

Epoxidized natural rubber (ENR25): ENR 25 (epoxidization ratio: 25% by mol, glass transition temperature: −41° C.) available from Guthrie Polymer sdn. Bhd.

Mica S 200HG: Mica S-200 HG (Phlogopite, average particle diameter: 50 μm, average aspect ratio: 55) available from REPCO Inc.

Silica (Z115Gr): Z115GR ($N_2SA$: 112 m$^2$/g) available from RHODIA

Silane coupling agent: Si75 (bis(3-triethoxysilylpropyl)disulfide) available from Degussa GmbH Stearic acid: TSUBAKI available from NOF Corporation.

Antioxidant RD: NOCRAC 224 (2,2,4-trimethyl-1,2-dihydroquinoline polymer) available from OUCHI SHINKO CHEMICAL INDUSTRIAL CO., LTD.

Mineral oil: DIANA PROCESS PA32 available from Idemitsu Kosan Co., Ltd.

Sulfur: Sulfur Powder treated with 5% of oil available from TSURUMI CHEMICAL INDUSTRY CO., LTD.

Vulcanization accelerator DM: NOCCELER DM (di-2-benzothiazolyl disulfide) available from OUCHI SHINKO CHEMICAL INDUSTRIAL CO., LTD.

Vulcanization accelerating aid V200: TACKIROL V200 (alkylphenol-sulfur chloride condensate, x and y: 2, R: $C_8H_{17}$ alkyl group, content of sulfur: 24% by mass) available from Taoka Chemical Co., Ltd.

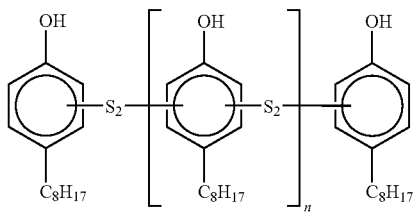

(wherein n is an integer of 0 to 10.)

Zinc oxide powder: Zinc Oxide available from Mitsui Mining and Smelting Co., Ltd.

Examples 1 to 12 and Comparative Examples 1 to 12

X Kneading, Y Kneading and F Kneading

X kneading, Y kneading and F kneading were carried out according to prescriptions shown in Tables 1 and 2, to produce the vulcanization rubber compositions of Examples 1 to 12 and Comparative Examples 1 to 12.

X kneading was carried out at the condition of kneading temperature of 150° C. and kneading time of 4 minutes with a Banbury mixer, to obtain kneaded articles.

Y kneading was carried out at the condition of kneading temperature of 150° C. and kneading time of 3 minutes with a Banbury mixer, to obtain kneaded articles.

Insoluble sulfur, a vulcanization accelerator and CTP were added to the kneaded articles obtained and F kneading was carried out at the condition of kneading temperature of 95° C. and kneading time of 2 minutes with an open roll, to obtain unvulcanized rubber compositions. The vulcanized rubber compositions of Examples 1 to 12 and Comparative Examples 1 to 12 were produced by carrying out press vulcanization of the unvulcanized rubber compositions obtained under the condition of 170° C. for 12 minutes.

Respective compositions at carrying out the X kneading, Y kneading and F kneading are shown in Table 1 and 2.

(Viscoelasticity Test: Complex Elastic Modulus (E*) and Loss Tangent (Tan δ))

The complex elastic modulus E* (MPa) and loss tangent tan δ of the vulcanized rubber compositions at 30° C. were measured under the conditions of frequency of 10 Hz, initial stain of 10% and dynamic strain of 2%, with a viscoelasticity spectrometer manufactured by Iwamoto Seisakusyo K.K. It is indicated that the smaller the E* is, the more superior the composition is, and the smaller the tan δ is, the lower the heat build-up property is and the more superior the composition is.

(Air Permeability Test)

The air permeation quantity of the rubber sheets was measured according to ASTM D-1434-75M method and reciprocal numbers were respectively adopted. Further, referring the reciprocal number of the air permeation quantity of Comparative Example 1 to as 100 (basis), the reciprocal numbers of other air permeation quantities were respectively displayed by indices (air permeation index). It is indicated that the larger the air permeation index is, the less the air permeation quantity of the rubber sheet is and the air permeability of the rubber sheet is improved and preferable.

(Tensile Test)

Tensile test was carried out according to JIS K 6251 "Vulcanized rubber and Thermoplastic rubber—Determination method of Tensile property", with No. 3 dumbbell type test pieces comprising the vulcanized rubber compositions and elongation at break EB (%) was measured. It is indicated that the larger the EB is, the more superior the rubber is.

(Crack Growth Test)

Samples were prepared based on JIS K6260, bending crack growth test was carried out, 70% elongation was repeated for 300 thousand cycles to bend the rubber sheets and then, the length of cracks generated were measured. Further, the reciprocal number of measurement values was calculated, the reciprocal number of Example 1 was referred to as 100 and the reciprocal numbers of other measurement values were displayed by indices (Crack growth resistance). It is indicated that the larger the crack growth index is, the more the crack growth is preferably suppressed.

(Rolling Resistance)

The vulcanized rubber compositions prepared by the production process of the present invention were extruded and processed in film shape and they were laminated at a rubber thickness of 1.0 mm on a molding machine. They were used as the inner liner of tires to prepare automobile tires with a tire size of 195/65R15 and the rolling resistance of respective tires was measured on a drum. The tire of Comparative Example 1 was referred to as 100 (basis) and the rolling resistance indices of objective tires were determined. The larger the value of rolling resistance index is, the lower the rolling resistance is and the more superior the tire is.

The above-mentioned evaluation results are shown in Tables 1 and 2.

According to Example 2, air permeation index is good by using ENR in step (Y) in place of NR, but since ENR is low viscosity, the dispersion of filler is bad and crack growth is lowered.

According to Example 3, since V200 includes 24% of sulfur and has effect of enhancing E* (complex elastic modulus), powder sulfur was reduced to adjust hardness.

Example 4 reduced the rubber of step (Y) of Example 1.

Example 9 increased mica to 40 parts by mass in step (Y), but E* (complex elastic modulus) was high and tan δ was also high. Although crack growth is deteriorated, it is a value larger than that in Comparative Example 1.

Example 10 increased the content of chlorobutyl in the whole rubber components, and it was found that air permeation index is good and air retention property is improved. Herein, tan δ is high.

In Examples 11 and 12, silica is good in EB (elongation at break) and crack growth in comparison with carbon black. The deterioration of crack is compensated with the enhancement of E* (complex elastic modulus). When 45 parts by mass of filler in total are charged, shear is applied even if much polymer is not delivered to step (Y).

Although Comparative Example 9 re-milled Comparative Example 1, physical property was not improved. Filler and mica do not improve it. Mica and oil are lubricants to only slide and shear is not generated.

Example 13 replaced NR to ENR in Example 3. Crack growth resistance is more improved than Example 2 (ENR) by adjusting the chemicals of step (F) (V200 was compounded and the compounding amount of sulfur was reduced) and air permeation resistance is also superior.

TABLE 1

|  | Examples | | | | | | Comparative Examples | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Compounding amount (parts by mass) | | | | | | | | | | | | |
| X kneading 150° C. | | | | | | | | | | | | |
| (a) Butyl HT 1068 | 55 | 55 | 55 | 55 | 55 | 55 | 55 | 55 | 55 | 55 | 55 | 55 |
| (b) NR | — | — | — | 25 | — | — | 45 | — | 45 | 45 | — | 45 |
| (b) ENR 25 | — | — | — | — | — | — | — | 45 | — | — | — | — |
| Mica S-200HG | — | — | — | — | 5 | — | 25 | 25 | 25 | — | 25 | 25 |
| Silica Z115G | 10 | 10 | 10 | 10 | — | 10 | 10 | 10 | 10 | 10 | 10 | 10 |
| Carbon N660 | 20 | 20 | 20 | 20 | — | 20 | 20 | 20 | 20 | 20 | 20 | 20 |
| Silane coupling agent | — | — | — | — | — | — | — | — | — | — | — | — |
| Stearic acid | 1 | 1 | 1 | 1 | — | 1 | 1 | 1 | 1 | 1 | 1 | 1 |
| Antioxidant RD | 1 | 1 | 1 | 1 | — | 1 | 1 | 1 | 1 | 1 | 1 | 1 |
| Mineral oil | — | — | — | — | — | 12 | 12 | 12 | 12 | 12 | 12 | — |
| Y kneading 150° C. | | | | | | | | | | | | |
| NR | 45 | — | 45 | 20 | 45 | 45 | No Kneading | No Kneading | No Kneading | — | 45 | — |
| ENR | — | 45 | — | — | — | — | | | | — | — | — |
| Mica S-200HG | 25 | 25 | 25 | 25 | 20 | 25 | | | | 25 | — | — |
| Mineral oil | 12 | 12 | 12 | 12 | 12 | — | | | | — | — | 12 |
| F kneading 95° C. | | | | | | | | | | | | |
| Powder sulfur | 0.5 | 0.5 | 0.3 | 0.5 | 0.5 | 0.5 | 0.5 | 0.5 | 0.3 | 0.5 | 0.5 | 0.5 |
| Vulcanization accelerator DM | 1.2 | 1.2 | 1.2 | 1.2 | 1.2 | 1.2 | 1.2 | 1.2 | 1.2 | 1.2 | 1.2 | 1.2 |
| Vulcanization accelerating aid V200 | — | — | 1.5 | — | — | — | — | — | 1.5 | — | — | — |
| Zinc oxide | 4 | 4 | 4 | 4 | 4 | 4 | 4 | 4 | 4 | 4 | 4 | 4 |
| Evaluation | | | | | | | | | | | | |
| E* 30° C. | 4.7 | 4.4 | 4.6 | 4.9 | 4.8 | 4.8 | 5.2 | 5.0 | 5.3 | 5.0 | 4.9 | 5.1 |
| tan δ 30° C. | 0.195 | 0.199 | 0.170 | 0.201 | 0.202 | 0.199 | 0.21 | 0.218 | 0.18 | 0.211 | 0.202 | 0.205 |
| Air permeation index | 105 | 125 | 105 | 105 | 102 | 102 | 100 | 120 | 100 | 100 | 100 | 95 |
| Elongation at break EB % | 550 | 545 | 515 | 535 | 520 | 540 | 510 | 500 | 465 | 530 | 540 | 520 |

TABLE 1-continued

|  | Examples | | | | | | Comparative Examples | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Crack growth index | 300 | 170 | 350 | 180 | 170 | 260 | 100 | 50 | 110 | 105 | 120 | 105 |
| Rolling resistance index | 103 | 105 | 110 | 105 | 104 | 104 | 100 | 98 | 105 | 99 | 98 | 100 |

TABLE 2

|  | Examples | | | | | | | Comparative Examples | | | | | |
| --- | --- | --- | --- | --- | --- | --- | --- | --- | --- | --- | --- | --- | --- |
|  | 7 | 8 | 9 | 10 | 11 | 12 | 13 | 7 | 8 | 9 | 10 | 11 | 12 |
| Compounding amount (parts by mass) | | | | | | | | | | | | | |
| X kneading 150° C. | | | | | | | | | | | | | |
| (a) Butyl HT 1068 | 40 | 80 | 40 | 50 | 55 | 55 | 55 | 55 | 55 | 55 | 95 | 55 | 55 |
| (b) NR | — | — | — | 5 | 20 | 20 | — | — | — | — | 5 | 45 | 20 |
| (b) BR150B | — | — | — | — | — | — | — | — | 20 | — | — | — | — |
| Mica S-200HG | — | — | — | — | — | — | — | 25 | 25 | 25 | 25 | — | — |
| Silica Z115G | 10 | 10 | 10 | 10 | 10 | 35 | 10 | 25 | 10 | 10 | 10 | 10 | 35 |
| Carbon N660 | 20 | 20 | 20 | 20 | 35 | 10 | 20 | 5 | 20 | 20 | 20 | 35 | 10 |
| Silane coupling agent | — | — | — | — | — | 2.8 | — | 2 | — | — | — | — | 2.8 |
| Stearic acid | 1 | 1 | 1 | 1 | — | — | 1 | 1 | 1 | 1 | 1 | 1 | 1 |
| Antioxidant RD | 1 | 1 | 1 | 1 | — | — | 1 | 1 | 1 | 1 | 1 | 1 | 1 |
| Mineral oil | — | — | — | — | — | — | — | 12 | 12 | 12 | 12 | 12 | 12 |
| Y kneading 150° C. | | | | | | | | | | | | | |
| (a) HT1068 | — | — | — | 45 | — | — | — | No Kneading | No Kneading | Re-mill | No Kneading | No Kneading | No Kneading |
| (b) NR | 60 | 20 | 60 | — | 25 | 25 | — | | | | | | |
| (b) ENR | — | — | — | — | — | — | 45 | | | | | | |
| Mica S-200HG | 25 | 25 | 40 | 25 | 25 | 25 | 25 | | | | | | |
| Mineral oil | 12 | 12 | 12 | 12 | 12 | 12 | 12 | | | | | | |
| F kneading 95° C. | | | | | | | | | | | | | |
| Powder sulfur | 0.3 | 0.3 | 0.3 | 0.3 | 0.1 | 0.1 | 0.1 | 0.5 | 0.5 | 0.5 | 0.3 | 0.3 | 0.3 |
| Vulcanization accelerator DM | 1.2 | 1.2 | 1.2 | 1.2 | 1.2 | 1.2 | 1.2 | 1.2 | 1.2 | 1.2 | 1.2 | 1.2 | 1.2 |
| Vulcanization accelerating aid V200 | 1.5 | 1.5 | 1.5 | 1.5 | 1.5 | 1.5 | 1.5 | — | — | — | 1.5 | 1.5 | 1.5 |
| Zinc oxide | 4 | 4 | 4 | 4 | 4 | 4 | 4 | 4 | 4 | 4 | 4 | 4 | 4 |
| Evaluation | | | | | | | | | | | | | |
| E* 30° C. | 4.7 | 4.4 | 5.2 | 4.2 | 5.2 | 4.6 | 4.3 | 5.2 | 5.2 | 5.1 | 4.7 | 6.0 | 5.3 |
| tan δ 30° C. | 0.165 | 0.185 | 0.214 | 0.245 | 0.212 | 0.200 | 0.181 | 0.235 | 0.204 | 0.216 | 0.26 | 0.235 | 0.212 |
| Air permeation index | 80 | 135 | 95 | 145 | 105 | 105 | 125 | 100 | 80 | 100 | 140 | 100 | 100 |
| Elongation at break EB % | 550 | 545 | 470 | 600 | 450 | 540 | 570 | 620 | 420 | 520 | 520 | 380 | 470 |
| Crack growth index | 300 | 200 | 130 | 320 | 120 | 200 | 260 | 150 | 250 | 100 | 150 | 80 | 120 |
| Rolling resistance index | 111 | 108 | 100 | 100 | 100 | 104 | 108 | 97 | 103 | 100 | 93 | 92 | 97 |

According to the production process of a rubber composition of the present invention, a rubber composition superior in LRR (low rolling resistance=low tan δ), air permeation resistance and durability performance can be obtained.

What is claimed is:

1. A production process of a rubber composition comprising the following (X), (Y) and (F) steps:
   (1) step (X) of kneading a rubber component (A) comprising a butyl rubber and 5 to 50 parts by mass of at least one filler for reinforcement selected from a group consisting of silica and carbon black based on 100 parts by mass of whole rubber components (C), the proportion of the rubber component (A) occupying the whole rubber components (C) being 10 to 90% by mass,
   (2) step (Y) of adding a rubber component (B) and 5 to 50 parts by mass of mica based on 100 parts by mass of the whole rubber components (C) to the kneaded article obtained by step (X) and kneading it, the proportion of the rubber component (B) occupying the whole rubber components (C) being 10 to 90% by mass, and
   (3) step (F) of adding sulfur, a vulcanization accelerator and a vulcanization accelerating aid to the kneaded article obtained by step (Y) and kneading it,
   wherein the whole rubber components (C) comprises 30 to 100% by mass of butyl rubber.

2. The production process of claim 1, adding 20 to 50 parts by mass of at least one filler for reinforcement selected from the group consisting of silica and carbon black based on 100 parts by mass of the whole rubber components (C) comprising 30 to 100% by mass of butyl rubber, in step (X).

3. The production process of claim 1, further adding 10 to 70 parts by mass of epoxidized natural rubber based on 100 parts by mass of the whole rubber components (C) comprising 30 to 90% by mass of butyl rubber, in step (Y).

4. A rubber composition produced by the process of claim 1.

5. A tire having a tread and an inner liner, wherein the inner liner comprises the rubber composition of claim 4.

* * * * *